(No Model.)
S. ELLIOTT.
BICYCLE.
No. 509,429. Patented Nov. 28, 1893.
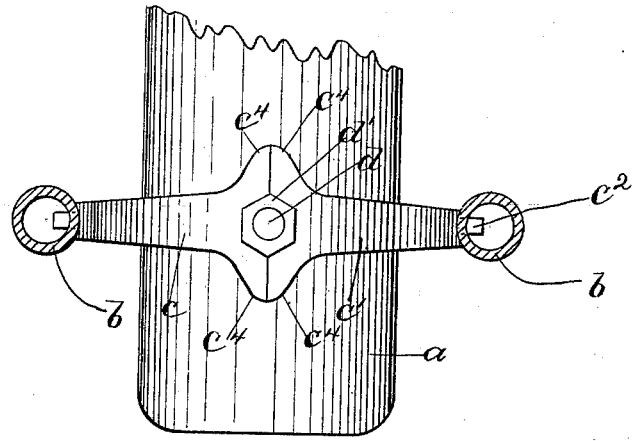
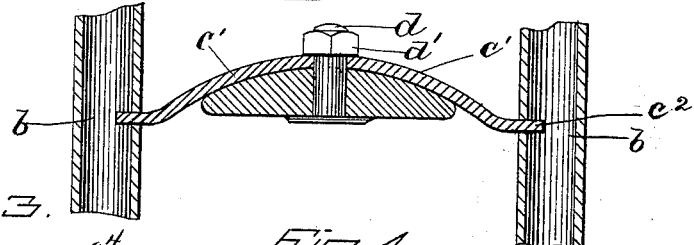
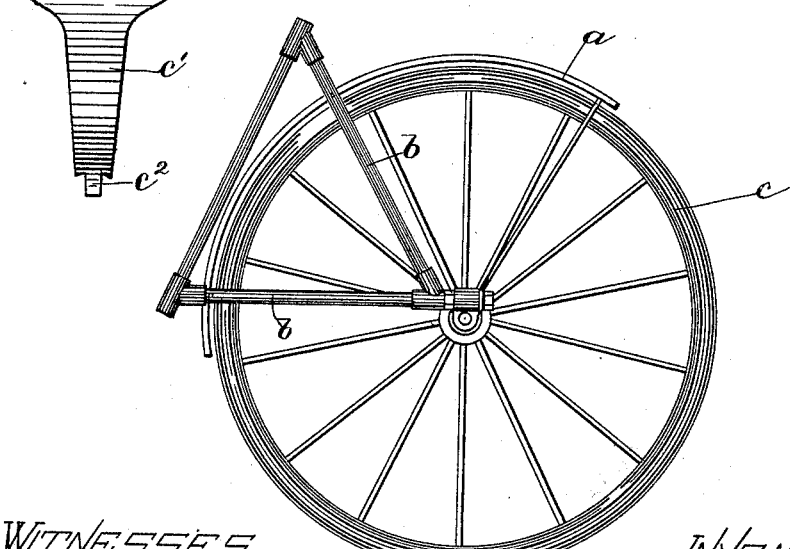
WITNESSES
Frederick W. Cole
Charles B. Crocker
INVENTOR
Sterling Elliott
by B. J. Noyes
Atty.

UNITED STATES PATENT OFFICE.

STERLING ELLIOTT, OF NEWTON, ASSIGNOR TO THE HICKORY WHEEL COMPANY, OF SOUTH FRAMINGHAM, MASSACHUSETTS.

BICYCLE.

SPECIFICATION forming part of Letters Patent No. 509,429, dated November 28, 1893.

Application filed February 18, 1893. Serial No. 462,805. (No model.)

*To all whom it may concern:*

Be it known that I, STERLING ELLIOTT, of Newton, county of Middlesex, State of Massachusetts, have invented an Improvement in Bicycles, of which the following description, in connection with the accompanying drawings, is a specification, like letters on the drawings representing like parts.

This invention has for its object to improve the construction of the means employed for connecting the mud guard to the frame of a bicycle, whereby said guard may be removed whenever desired, and may again be replaced easily and quickly, and when removed the frame will not be disfigured.

In accordance with this invention the mud guard is supplied with a bolt or equivalent by which it may be bolted to a cross piece interposed between and connected with the arms of the frame which astrides the wheel, said cross piece being divided transversely at the middle into two parts whereby it may be removed when not in use. The parts of the cross piece are preferably made alike, each having at its outer end a small projection adapted to enter a recess in the frame, and having at its opposite end a semicircular recess for the shank of the bolt, and when said parts are in engagement with the frame and the mud guard connected thereto, their inner ends will abut against each other, encircling the shank of the bolt, while the nut on said bolt, or it may be the head of said bolt, will bear upon the exposed sides or faces of the parts at their adjacent ends, thereby holding them firmly between the nut and mud guard.

Figure 1, shows in front elevation a portion of a mud guard, frame, and means embodying this invention for connecting the mud guard with the frame; Fig. 2, an end view of the parts shown in Fig. 1; Fig. 3, a detail of one of the parts of the cross piece, and Fig. 4, a side elevation of a portion of a bicycle showing the frame, and mud guard.

The mud guard $a$, and the frame composed of arms $b, b$, which astride the wheel $c$, are or may be of any usual or suitable construction. The frame in this instance is composed of two pairs of arms $b, b$, and the mud guard is connected to each pair in a like manner so that one connection only will be described.

Interposed between and connected with the arms $b, b$, is a cross piece, divided transversely at the middle into two parts $c, c'$. These parts are made alike, each having at its outer end a projection $c^2$, adapted to enter a recess in the arm made to receive it, and having at its opposite or inner end a semicircular recess $c^3$, to receive the shank of the bolt $d$ which passes through the mud guard. The inner ends of said parts $c, c'$, abut against each other as shown in Fig. 1, thereby encircling the shank of the bolt, and when in such position, resting upon or against the outer face of the mud guard, the nut $d'$ is turned on the bolt, and brought to bear upon the outer or exposed sides or faces of both parts at their adjacent ends holding them firmly down upon or against the mud guard. The inner ends of said parts are provided with flat lateral projections $c^4$, which increase the bearing surfaces adjacent the bolt.

To remove the mud guard the nut $d'$ is loosened, and the parts $c, c'$ removed. These parts $c, c'$, may be differently shaped and yet subserve the same ends, and instead of employing a bolt, any other securing device which co-operates with the separable or two part cross piece in substantially the manner herein shown I deem to be an equivalent thereof.

I claim—

1. The combination of a mud guard and a separable cross piece interposed between and connected with the arms of the frame to which said mud guard is connected by a bolt or equivalent, substantially as described.

2. The combination of a mud guard and separable cross piece interposed between and detachably connected with the arms of the frame to which said mud guard is connected by a bolt or equivalent, substantially as described.

3. The combination of a mud guard and cross piece divided transversely at the middle into two parts, the outer extremities of which are connected with the arms of the frame and the inner or adjacent ends of which embrace a bolt or equivalent by means of which the mud guard is connected thereto, substantially as described.

4. The combination of a mud guard and cross piece, divided transversely at the middle into two parts, the outer extremities of which are provided with projections adapted to enter recesses in the arms of the frame, and the inner or adjacent ends embrace a bolt or equivalent by means of which the mud guard is connected thereto, substantially as described.

5. The combination of a mud guard and cross piece divided transversely at the middle into two parts, the outer extremities of which are connected with the arms of the frame, and the inner or adjacent ends of which embrace a bolt or equivalent by means of which the mud guard is connected thereto, said inner ends being provided with lateral projections $c^4$, substantially as described.

In testimony whereof I have signed my name to this specification in the presence of two subscribing witnesses.

STERLING ELLIOTT.

Witnesses:
BERNICE J. NOYES,
CHARLES B. CROCKER.